April 19, 1932.  R. BARTHELEMY  1,854,682
TELEVISION DEVICE
Filed Feb. 5, 1931

Inventor
René Barthelemy
by Wilkinson & Mawhinney
Attorneys.

Patented Apr. 19, 1932

1,854,682

UNITED STATES PATENT OFFICE

RENÉ BARTHELEMY, OF FONTENAY-AUX-ROSES, FRANCE, ASSIGNOR TO COMPAGNIE POUR LA FABRICATION DES COMPTEURS ET MATERIEL D'USINES A GAZ, OF MONTROUGE, SEINE, FRANCE, A JOINT-STOCK COMPANY OF FRANCE

TELEVISION DEVICE

Application filed February 5, 1931, Serial No. 513,757, and in France February 13, 1930.

It is known that a fixed or movable image sent by wire or wireless waves is reconstructed at the receiving end by points or preferably by elementary lines successively juxtaposed. In order that the reconstructed image shall produce an impression of continuity on the eye, it is necessary that the distance between two adjacent lines shall correspond approximately to the limit of visual acuity of medium sight. This requires that the observer shall be removed to a certain distance from the plane of the image if the latter at the receiving end be of large dimensions and if the number of lines be restricted.

Now if the receiver is placed in a locality of reduced dimensions or if the observer, uninformed, place himself very near the image hoping to see better, the division of the elements becomes visible and the illusion is lost.

The object of the present invention is to provide a device enabling the image to be removed to the minimum appropriate distance from the observer, even if the latter post himself near the receiving apparatus.

Figure 1:
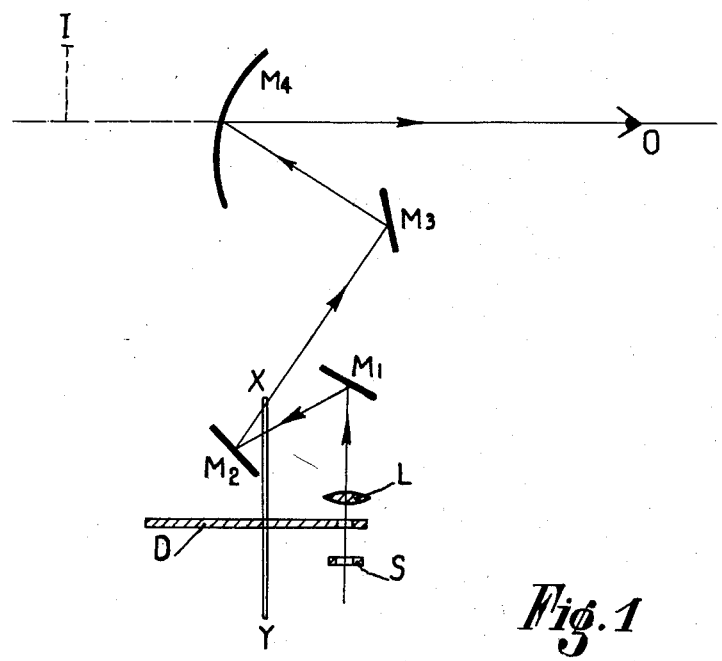
Figure 2:
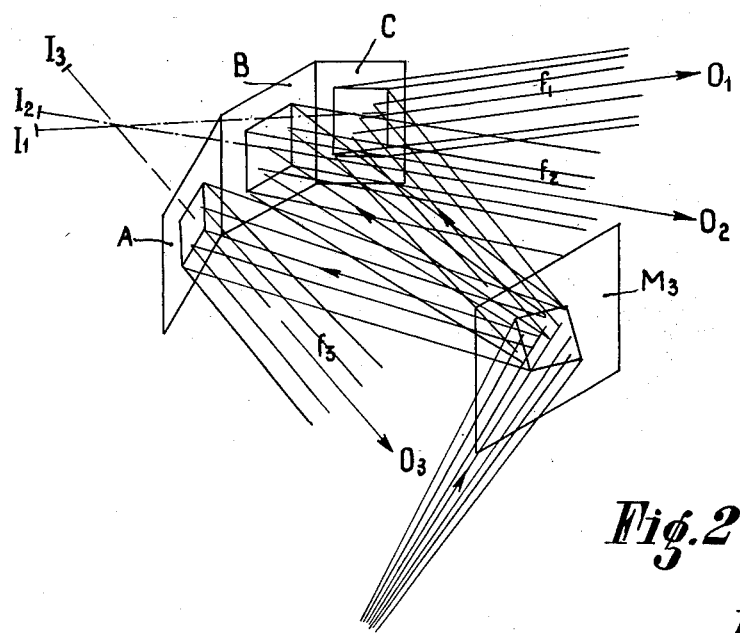

An example of this device has been disclosed in the accompanying drawings wherein:

Fig. 1 discloses a system of mirrors arranged so as to situate the object at the requisite distance from the observer, and Fig. 2 illustrates a modification enabling a plurality of observers to view the image without having to crowd together.

The device according to the invention is constituted by one or several reflecting mirrors which increase inside the apparatus the path of the luminous ray emitted by the lamp the light of which is modulated.

It might be expected that a similar result would be obtained by reducing the dimensions of the image. Practice however proves the contrary for the human eye has been educated to prefer a life size image placed a few yards away to a reduced image seen from close up.

Generally the optical system at the receiving end is formed by one or two lenses magnifying the reconstructed image observed on the scanning disc. The optical system will therefore be completed by a mirror or a totally reflecting prism (or even, if necessary, by a combination of several of these elements) which receives the luminous beam passing through the lenses and reflects it in the direction of the observer. The luminous ray may be thus easily constrained to travel on a path which is such that the visual acuity is incapable of detecting the analysis of the projection in space while the visual inertia of the human eye prevents it from distinguishing the discontinuity of the image in time, the total scanning operation requiring less than one tenth of a second.

In Fig. 1, $M_1$, $M_2$, $M_3$ are three plane mirrors and $M_4$ is a concave mirror giving a magnified virtual image I which appears to lie far behind the mirror $M_4$ if the distance from the mirror $M_4$ of the virtual image thrown by the mirror $M_3$ is slightly less than the focal length of said mirror $M_4$. In reality the virtual image I is formed much further back from the mirror $M_4$ than as shown in the figure. The scanning disc D is assumed to rotate on a vertical spindle XY and the modulated light source S is viewed by the mirror $M_1$ through the lens L which acts as a magnifying glass. In this device, the concave mirror $M_4$ must have a fairly large focal length, often greater than one yard, so that the observer O shall see a clear and distinct image.

In order to adapt the field of vision for a large number of spectators, the last plane or concave mirror may be replaced by two or more plane or concave mirrors slightly offset from each other as shown in Fig. 2 in which has been illustrated a system of three plane mirrors A, B, C replacing the concave mirror $M_4$. Thus three virtual images $I_1$, $I_2$, $I_3$ instead of one are obtained and the groups of observers $O_1$, $O_2$, $O_3$ who take up their stand in the direction of the arrows $f_1$, $f_2$, $f_3$ can observe the scene without interfering with each other.

I claim:

In a television receiving apparatus, the combination with a source of light and a perforated scanning disc rotatably positioned in spaced relation to said light source and on which the reconstructed picture is viewed, a plurality of plane mirrors located in spaced relation to each other and reflecting the light from said source on to each other successively, and a system of plane mirrors arranged at predetermined angles to one another and co-operating with the last of the aforesaid mirrors to throw a plurality of images visible in various localities.

RENÉ BARTHELEMY.